United States Patent
Tang

(10) Patent No.: US 11,792,831 B2
(45) Date of Patent: Oct. 17, 2023

(54) METHOD AND DEVICE FOR SIGNAL TRANSMISSION

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 1 day.

(21) Appl. No.: 17/018,220

(22) Filed: Sep. 11, 2020

(65) Prior Publication Data

US 2020/0413415 A1 Dec. 31, 2020

Related U.S. Application Data

(63) Continuation of application No. PCT/CN2018/079916, filed on Mar. 21, 2018.

(51) Int. Cl.
*H04W 24/10* (2009.01)
*H04W 72/53* (2023.01)
*H04W 72/0446* (2023.01)
*H04W 72/0453* (2023.01)
(Continued)

(52) U.S. Cl.
CPC ............ *H04W 72/53* (2023.01); *H04W 24/10* (2013.01); *H04W 72/046* (2013.01); *H04W 72/0446* (2013.01); *H04W 72/0453* (2013.01); *H04W 74/0808* (2013.01)

(58) Field of Classification Search
CPC ............. H04W 72/0493; H04W 24/10; H04W 72/0446; H04W 72/0453; H04W 72/046; H04W 74/0808; H04W 16/14; H04W 72/1289; H04B 7/088; H04B 7/0695; H04B 7/0617; H04B 7/0408; H04B 7/0697; H04B 7/0495
See application file for complete search history.

(56) References Cited

U.S. PATENT DOCUMENTS

2015/0229375 A1* 8/2015 Vook .................... H04W 72/046
370/329
2018/0368142 A1* 12/2018 Liou .................. H04W 74/0808
(Continued)

FOREIGN PATENT DOCUMENTS

| AU | 2015296114 A1 * | 2/2017 | ........... H04B 7/0634 |
|---|---|---|---|
| CN | 106464336 A | 2/2017 | |
| CN | 106507439 A | 3/2017 | |

(Continued)

OTHER PUBLICATIONS

Extended European Search Report for EP Application 18911266.7 dated Feb. 9, 2021. (7 pages).

(Continued)

*Primary Examiner* — Thai Nguyen
(74) *Attorney, Agent, or Firm* — Young Basile Hanlon & MacFarlane, P.C.

(57) ABSTRACT

Implementations of the present disclosure provide a method and device for signal transmission. The method comprises: a first device transmits at least one first signal on a first carrier by means of a first beam, the first beam comprising at least one beam; the first device receives at least one second signal sent by a second device on the first carrier.

12 Claims, 4 Drawing Sheets

(51) Int. Cl.
H04W 72/044 (2023.01)
H04W 74/08 (2009.01)

(56) References Cited

U.S. PATENT DOCUMENTS

2019/0082426 A1* 3/2019 Liou ................ H04B 7/02
2019/0280836 A1* 9/2019 Bhattad ............ H04W 24/10

FOREIGN PATENT DOCUMENTS

| | | | | |
|---|---|---|---|---|
| CN | 106900075 A | 6/2017 | | |
| EP | 2887561 A1 | 6/2015 | | |
| EP | 3413607 A1 | 12/2018 | | |
| WO | WO-2010138921 A2 * | 12/2010 | ......... | H04L 27/2605 |
| WO | WO-2016004900 A1 * | 1/2016 | ........... | H04L 1/1854 |
| WO | 2016154809 A1 | 10/2016 | | |
| WO | WO-2016188312 A1 * | 12/2016 | ........... | H04B 7/0617 |
| WO | 2017135455 A1 | 8/2017 | | |

OTHER PUBLICATIONS

Indian Examination Report for IN Application 202027044390 dated Jul. 14, 2021. (5 pages).
International Search Report PCT/CN2018/079916 dated Dec. 3, 2018.
3GPP TSG RAN WG1 Meeting #92; Athens, Greece, Feb. 26-Mar. 2, 2018; R1-1802611.
Communication pursuant to Article 94(3) EPC for EP Application 18911266.7 dated Dec. 12, 2022. (5 pages).
Communication pursuant to Article 94(3) EPC for EP Application 18911266.7 dated Jun. 2, 2023. (6 pages).

* cited by examiner

METHOD AND DEVICE FOR SIGNAL TRANSMISSION

CROSS-REFERENCE TO RELATED APPLICATION(S)

This application is a continuation application of International Application No. PCT/CN 2018/079916, filed on Mar. 21, 2018, the entire disclosure of which is hereby incorporated by reference

TECHNICAL FIELD

Implementations of the present disclosure relate to the field of communication, and more particularly, to a method and a device for signal transmission.

BACKGROUND

On an unlicensed spectrum, a communication device follows the principle of "Listen Before Talk (LBT)", that is, the communication device needs to perform channel listening before sending a signal on a channel of the unlicensed spectrum. Only when a result of the channel listening is that the channel is idle can the communication device perform signal transmission. If the result of the channel listening for the communication device on the channel of the unlicensed spectrum is that the channel is busy, the communication device cannot perform signal transmission.

A mechanism of Carrier Sense Multiple Access with Collision Avoidance (CSMA/CA) may be adopted for Wireless Fidelity (Wi-Fi) on the unlicensed spectrum. A Request To Send/Clear To Send (RTS/CTS) interaction mechanism may be used for channel access. For example, if a device 1 wants to transmit data to a device 2, an RTS signal needs to be sent on an available channel to indicate that the device 1 wants to send data to the device 2. After the device 2 receives the RTS signal, a CTS signal may be sent to all devices on an available channel to indicate that the device 2 is ready. In this case, the device 1 may send data to the device 2, while other devices cannot send data to the device 2. After receiving a CTS signal sent by the device 2, the device 1 may transmit data to the device 2 on a carrier where the CTS signal is received.

However, when a New Radio (NR) technology is applied to an unlicensed carrier, a beamforming technology is introduced. In this case, how to perform channel listening to implement data transmission is a problem worth studying.

SUMMARY

Implementations of the present disclosure provide a method and a device for signal transmission.

In a first aspect, a method for signal transmission is provided. The method includes: sending, by a first device, at least one first signal on a first carrier through a first beam, wherein the first beam includes at least one beam; and receiving, by the first device, on the first carrier, at least one second signal sent by a second device.

Optionally, the first carrier may be a carrier on an unlicensed spectrum.

Optionally, the first device is a terminal device or a network device.

Optionally, in an implementation of the present disclosure, the first signal and the second signal may be reference signals. For example, the first signal or the second signal may be one or more of a Primary Synchronization Signal (PSS), a Secondary Synchronization Signal (SSS), a Channel-State Information Reference Signal (CSI-RS), a Demodulation Reference Signal (DMRS), a Phase Tracking Reference Signal (PT-RS), and a Sounding Reference Signal (SRS). For another example, the first signal or the second signal is a reference signal newly introduced by a system for interactive purposes.

Optionally, the sending of the at least one second signal by the second device may be omnidirectional.

In some possible implementations, sending, by the first device, on the first carrier, the at least one first signal through the first beam, includes: sending, by the first device, on the first carrier, the at least one first signal using a first subcarrier interval and through the first beam, wherein the first subcarrier interval is specified by a communication system, or the first subcarrier interval is pre-designated by a network device, or the first subcarrier interval is determined by a subcarrier interval configured by a network device for data transmission.

In some possible implementations, the at least one first signal is used for determining at least one of beam indication information of at least one beam among beams included in the first beam and a resource used for transmission of the at least one second signal.

In some possible implementations, receiving, by the first device, on the first carrier, the at least one second signal sent by the second device, includes: receiving, by the first device, on the first carrier, the at least one second signal sent by the second device using a second subcarrier interval, wherein the second subcarrier interval is the same as the first subcarrier interval, or the second subcarrier interval is specified by a communication system, or the second subcarrier interval is pre-designated by a network device, or the second subcarrier interval is determined by a subcarrier interval configured by a network device for data transmission.

In some possible implementations, receiving, by the first device, on the first carrier, the at least one second signal sent by the second device, includes: receiving, by the first device, on the first carrier, the at least one second signal sent by the second device through a second beam, wherein the second beam includes at least one beam, and a spatial domain coverage corresponding to the second beam at least partially overlaps with a spatial domain coverage corresponding to the first beam.

In some possible implementations, the spatial domain coverage corresponding to the second beam at least partially overlaps with the spatial domain coverage corresponding to the first beam, including: the spatial domain coverage corresponding to the second beam is a subset of the spatial domain coverage corresponding to the first beam.

In some possible implementations, the at least one second signal is used for determining beam indication information of a third beam, wherein the third beam includes at least one of an optimal beam of at least one beam included in the first beam measured by the second device and a suboptimal beam of at least one beam included in the first beam measured by the second device.

In some possible implementations, the first device sends the at least one first signal through the first beam on a first time domain resource on the first carrier, and the first device receives, on a second time domain resource on the first carrier, the at least one second signal sent by the second device, wherein a length of time between the second time domain resource and the first time domain resource is specified by a communication system, or a length of time between the second time domain resource and the first time domain resource is pre-designated by a network device.

In some possible implementations, the method further includes: sending, by the first device, a first physical channel to the second device on the first carrier.

Optionally, in some implementations, the sending of the first physical channel by the first device to the second device may be omnidirectional.

In some possible implementations, the first device sends, on the first carrier, the first physical channel to the second device through a fourth beam, wherein a spatial domain coverage corresponding to the fourth beam at least partially overlaps with a spatial domain coverage corresponding to the first beam.

In some possible implementations, the fourth beam is one beam in the first beam, or the fourth beam is one beam in the third beam.

In some possible implementations, the method further includes: receiving, by the first device, on the first carrier, at least one second signal sent by a third device.

In some possible implementations, the method further includes: sending, by the first device, on the first carrier, a second physical channel to the third device.

In a second aspect, a method for signal transmission is provided. The method includes: receiving, by a second device, on a first carrier, at least one first signal sent by a first device through a first beam, wherein the first beam includes at least one beam; and performing, by the second device, channel detection on the first carrier to determine whether at least one second signal is sent.

In some possible implementations, the method further includes: sending, by the second device, the at least one second signal on the first carrier when the channel detection on the first carrier is successful.

In some possible implementations, sending, by the second device, the at least one second signal on the first carrier includes: sending, by the second device, on the first carrier, the at least one second signal using a second subcarrier interval, wherein the second subcarrier interval is specified by a communication system, or the second subcarrier interval is pre-designated by a network device, or the second subcarrier interval is determined by a subcarrier interval configured by a network device for data transmission.

In some possible implementations, sending, by the second device, the at least one second signal on the first carrier includes: sending, by the second device, on the first carrier, the at least one second signal through a second beam, wherein the second beam includes at least one beam, and a spatial domain coverage corresponding to the second beam at least partially overlaps with a spatial domain coverage corresponding to the first beam.

In some possible implementations, the spatial domain coverage corresponding to the second beam at least partially overlaps with the spatial domain coverage corresponding to the first beam including: the spatial domain coverage corresponding to the second beam is a subset of the spatial domain coverage corresponding to the first beam.

In some possible implementations, the at least one second signal is used for determining beam indication information of a third beam, wherein the third beam includes at least one of an optimal beam of at least one beam included in the first beam measured by the second device and a suboptimal beam of at least one beam included in the first beam measured by the second device.

In some possible implementations, the second device receives, on a first time domain resource on the first carrier, the at least one first signal sent by the first device through the first beam, and the second device performs channel detection on a second time domain resource on the first carrier to determine whether the at least one second signal is sent, wherein a length of time between the second time domain resource and the first time domain resource is specified by a communication system, or length of time between the second time domain resource and the first time domain resource is pre-designated by a network device.

In some possible implementations, receiving, by the second device, on the first carrier, the at least one first signal sent by the first device through the first beam includes: receiving, by the second device, on the first carrier, the at least one first signal sent by the first device using a first subcarrier interval and through the first beam, wherein the first subcarrier interval is specified by a communication system, or the first subcarrier interval is pre-designated by a network device, or the first subcarrier interval is determined by a subcarrier interval configured by a network device for data transmission.

In some possible implementations, the at least one first signal is used for determining at least one of beam indication information of at least one beam included in the first beam and resources used for transmission of the at least one second signal.

In a third aspect, a device for signal transmission is provided for executing the method in the first aspect or any possible implementation of the first aspect. The device includes units for executing the method in the first aspect or any possible implementation of the first aspect.

In a fourth aspect, a device for signal transmission is provided, and the device includes a memory, a processor, an input interface, and an output interface. The memory, the processor, the input interface and the output interface are connected through a bus system. The memory is used for storing instructions, and the processor is used for executing the instructions stored in the memory for executing the method of the first aspect or any one of the possible implementations of the first aspect.

In a fifth aspect, a device for signal transmission is provided for executing the method in the second aspect or any possible implementation of the second aspect. The device includes units for executing the method in the second aspect or any possible implementation of the second aspect.

In a sixth aspect, a device for signal transmission is provided, and the device includes a memory, a processor, an input interface, and an output interface. The memory, the processor, the input interface and the output interface are connected through a bus system. The memory is used for storing instructions, and the processor is used for executing the instructions stored in the memory for executing the method in the second aspect or any possible implementation of the second aspect.

In a seventh aspect, a computer storage medium is provided for storing computer software instructions for executing the method in the first aspect or any possible implementation of the first aspect, and the computer software instructions include programs designed for executing the aspect.

In an eighth aspect, a computer program product containing instructions is provided, when the instructions are run on a computer, the computer is enabled to execute the method in the first aspect or any possible implementation of the first aspect.

In a ninth aspect, a computer storage medium is provided for storing computer software instructions for executing the method in the second aspect or any possible implementation of the second aspect, and the computer software instructions include programs designed for executing the aspect.

In a tenth aspect, a computer program product containing instructions is provided, when the instructions are run on a computer, the computer is enabled to perform the method of the second aspect or any one of optional implementations of the second aspect.

DETAILED DESCRIPTION

Figure 1:
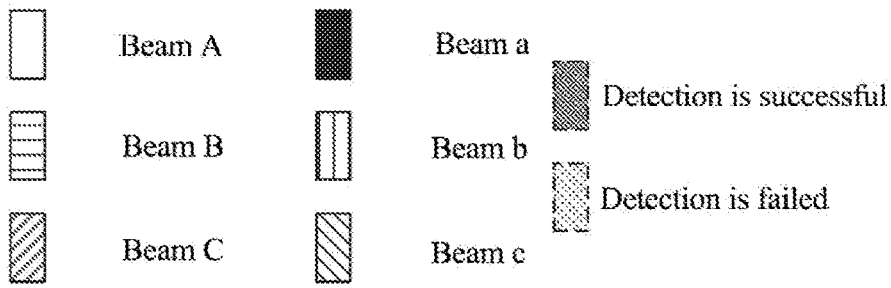
FIG. 1 is a schematic flow chart of a method for signal transmission according to an implementation of the present disclosure.

Hereinafter, technical solutions in the present disclosure will be described with reference to the accompanying drawings.

In the following, a technical solution in the present disclosure will be described in combination with drawings of the implementations of the present disclosure.

Implementations of the present disclosure can be applied to various communication systems, such as a Global System of Mobile Communication (GSM) system, a Code Division Multiple Access (CDMA) system, a Wideband Code Division Multiple Access (WCDMA) system, a General Packet Radio Service (GPRS) system, a Long Term Evolution (LTE) system, an Advanced long term evolution (LTE-A) system, a New Radio (NR) system, an NR system evolution system, an LTE-based access to unlicensed spectrum (LTE-U) system, an NR-based access to unlicensed spectrum (NR-U) system, a Universal Mobile Telecommunication System (UMTS), Wireless Local Area Networks (WLAN), Wireless Fidelity (WiFi), a Next Generation Communication System, or anther Communication System.

Generally speaking, the number of connections supported by traditional communication systems is limited and easy to be implemented. However, with the development of communication technology, mobile communication systems will not only support traditional communication, but also support, for example, Device to Device (D2D) communication, Machine to Machine (M2M) communication, Machine Type Communication (MTC), Vehicle to Vehicle (V2V) communication, etc. The implementations of the present disclosure may also be applied to these communication systems.

Optionally, a communication system in an implementation of the present disclosure may be applied to a Carrier Aggregation (CA) scenario, a Dual Connectivity (DC) scenario, and a Standalone (SA) network deployment scenario.

Applied spectrums are not limited in implementations of the present disclosure. For example, the implementations of the present disclosure can be applied to both licensed spectrum and unlicensed spectrum.

Implementations of the present disclosure describe various implementations in combination with a network device and a terminal device, wherein the terminal device may also be referred to as User Equipment (UE), an access terminal, a user unit, a user station, a mobile platform, a mobile station, a remote station, a remote terminal, a mobile device, a user terminal, a terminal, a wireless communication device, a user agent or a user apparatus, etc. The terminal device may be a STATION (ST) in a Wireless Local Area Network (WLAN), a cellular phone, a cordless phone, a Session Initiation Protocol (SIP) phone, a wireless local loop (WLL) station, a Personal Digital Assistant (PDA) device, a handheld device with capability of wireless communication, a computing device or another processing device connected to a wireless modem, an in-vehicle device, a wearable device, a terminal device in a next generation communication system such as a NR network, or a terminal device in a future evolved Public Land Mobile Network (PLMN) network, etc.

As an example but not a limitation, in an implementation of the present disclosure, the terminal device may also be a wearable device. A wearable device can also be called a wearable intelligent device, which is a general term for a wearable device, which is developed in intelligent design of daily wear by using wearable technology, such as glasses, gloves, watches, clothing and shoes. A wearable device is a portable device that is worn directly on the body or integrated into the user's clothes or accessories. A wearable device is not only a hardware device, but also includes powerful functions through software support, data interaction and cloud interaction. Generalized wearable smart devices include devices, such as smart watches or smart glasses, which are full-featured, large-sized and can realize full or partial functions without relying on smart phones, and devices, such as various smart bracelets and smart jewelry for physical sign monitoring, which are only focused on certain application functions and need to be used together with other devices.

The network device may be a device for communicating with a mobile device. The network device may be an Access Point (AP) in the WLAN, a Base Transceiver Station (BTS) in the GSM or CDMA, a NodeB (NB) in the WCDMA, an Evolutional Node B (eNB or eNodeB) in the Long Term Evolution (LTE), a relay station or an access point, an in-vehicle device, a wearable device, a network device (gNB) in the NR network, or a network device in the future evolved PLMN network.

In an implementation of the present disclosure, the network device provides services for a cell, and the terminal device communicates with the network device through transmission resources (e.g., frequency domain resources or spectrum resources) used by the cell. The cell may be a cell corresponding to the network device (e.g., a base station), the cell may belong to a macro base station, or may belong to a base station corresponding to a small cell. The small cell here may include: a Metro cell, a Micro cell, a Pico cell, a Femto cell, etc. These small cells have the characteristics of small coverage and low transmission power, and are suitable for providing high-speed data transmission services.

Optionally, downlink physical channels of implementations of the present disclosure may include a Physical Downlink Control Channel (PDCCH), an Enhanced Physical Downlink Control Channel (EPDCCH), a Physical Downlink Shared Channel (PDSCH), a Physical Hybrid ARQ Indicator Channel (PHICH), a Physical Multicast Channel (PMCH), a Physical Broadcast Channel (PBCH), etc. Downlink reference signals may include a downlink Synchronization Signal, a Phase Tracking Reference Signal (PT-RS), a downlink DeModulation Reference Signal (DMRS), a Channel State Information-Reference Signal (CSI-RS), etc. The downlink synchronization signal can be used for a communication device to access network and manage and measure radio resources. The downlink DMRS can be used for downlink channel demodulation. The CSI-RS can be used for downlink channel measurement, downlink time-frequency synchronization or phase tracking. The PT-RS can also be used for downlink channel measurement, downlink time-frequency synchronization or phase tracking. It should be understood that implementations of the present disclosure may include downlink physical channels or downlink reference signals with the same name and different functions as above, and may also include downlink physical channels or downlink reference signals with different names and the same functions as above, which is not limited in the present disclosure.

Optionally, the uplink physical channel of the implementation of the present disclosure may include a Physical Random Access CHannel (PRACH), a Physical Uplink Control CHannel (PUCCH), a Physical Uplink Shared Channel (PUSCH), etc. The uplink reference signal may include an uplink DeModulation Reference Signal (DMRS), a Sounding Reference Signal (SRS), a Phase Tracking Reference Signal (PT-RS), and the like. The uplink DMRS can be used for demodulation of an uplink channel, the SRS can be used for measurement of an uplink channel, uplink time-frequency synchronization or phase tracking, and the PT-RS can also be used for measurement of an uplink channel, uplink time-frequency synchronization or phase tracking. It should be understood that implementations of the present disclosure may include uplink physical channels or uplink reference signals with the same name and different functions as above, and may also include downlink physical channels or downlink reference signals with different names and the same functions as above, which is not limited in the present disclosure.

Methods for signal transmission according to implementations of the present disclosure will be described below with reference to FIGS. 1 to 4. It should be understood that FIGS. 1 to 4 are schematic flow charts of the methods for signal transmission according to the implementations of the present disclosure, showing detailed communication steps or operations of the methods, but these steps or operations are only examples, and an implementation of the present disclosure may also perform other operations or variations of various operations in FIGS. 1 to 4.

In addition, the acts in FIGS. 1 to 4 may be respectively performed in an order different from what is shown in FIGS. 1 to 4, and it is possible that not all operations in FIGS. 1 to 4 are to be performed.

FIG. 1 is a schematic flow chart of a method 100 for signal transmission according to an implementation of the present disclosure. As shown in FIG. 1, the method 100 may include the following contents.

In S110, a first device sends at least one first signal on a first carrier through a first beam, wherein the first beam includes at least one beam.

In S120, the first device receives, on the first carrier, at least one second signal sent by a second device.

Therefore, the first device can use the first beam to send the at least one first signal on the first carrier, and can receive, through the first carrier, the at least one second signal replied by the second device. This directivity-based interaction mode is beneficial to improve capability of space division multiplexing transmission for a cell.

Optionally, the first carrier may be a carrier on an unlicensed spectrum.

Optionally, in an implementation of the present disclosure, the first device is a terminal device or a network device.

Optionally, in an implementation of the present disclosure, the first signal and the second signal may be reference signals, for example, the first signal may be one or more of a Primary Synchronization Signal (PSS), a Secondary Synchronization Signal (SSS), a Channel-State Information Reference Signal (CSI-RS), a Demodulation Reference Signal (DMRS), a Phase Tracking Reference Signal (PT-RS), and a Sounding Reference Signal (SRS). For another example, the first signal is a reference signal newly introduced by the system for interactive purposes.

Optionally, in an implementation of the present disclosure, different beams may correspond to different first signals, or the expressions of the first signals transmitted by using different beams may be different. For example, different reference signal sequences may be transmitted by using different beams, so that the second device may determine the beams used for sending the first signals according to the received first signals.

Optionally, in some implementations, S110 may include: sending, by the first device, on the first carrier, the at least one first signal using a first subcarrier interval and through the first beam, wherein the first subcarrier interval is specified by a communication system, or the first subcarrier interval is pre-designated by a network device, or the first subcarrier interval is determined by a subcarrier interval configured by a network device for data transmission.

Optionally, the first subcarrier interval specified by the communication system may be considered fixed, the communication system may specify one or several subcarrier interval. For example, the communication system specifies that the first subcarrier interval is 60 kHz, then the first device sends the first signal by using the 60 kHz subcarrier interval, and the second device receives the first signal by using the 60 kHz subcarrier interval. For another example, if the communication system specifies that the first subcarrier interval is 60 kHz or 30 kHz, the first device sends the first signal by using the 60 kHz or 30 kHz subcarrier interval, and the second device performs blind detection on the first signal by using the 60 kHz and 30 kHz subcarrier interval respectively to determine the subcarrier interval of the first signal.

Optionally, the first subcarrier interval pre-designated (or preconfigured) by the network device may be considered semi-static, and the network device may reconfigure the first subcarrier interval through dynamic signaling or semi-static signaling.

Optionally, the first subcarrier interval is determined according to the subcarrier interval configured by the network device for data transmission. For example, the first subcarrier interval may be K times the subcarrier interval for data transmission, where K may be 1 or 2, etc.

Optionally, if the first device is a terminal device, the first subcarrier interval may be determined according to the subcarrier interval configured by the network device for uplink transmission, or, if the first device is a network device, the first subcarrier interval may be determined according to the subcarrier interval for downlink transmission.

Optionally, in some implementations, the first signal is used for determining at least one of beam indication information of at least one beam among beams included in the first beam and a resource used for transmission of the at least one second signal.

For example, the resource used for the transmission of the at least one second signal may include at least one of a time domain resources, frequency domain resource and a code domain resource used for the transmission of the at least one second signal, or may also include another resource for the transmission of the at least one second signal, which is not limited by the implementations of the present disclosure.

As an example but not a limitation, the beam indication information of one beam may include a signal index or beam identification of a reference signal satisfying a Quasi-Co-Located (QCL) relationship with the beam.

It should be understood that in an implementation of the present disclosure, that receiving the beam used for a signal can be understood as receiving a spatial domain reception filter used for a signal, and that sending the beam used for a signal can be understood as sending a spatial domain transmission filter used for a signal. For two signals sent by the same spatial domain transmission filter, it can be considered that the two signals are QCL with respect to spatial reception parameters.

Optionally, if the first device is a network device and the second device is a terminal device, the at least one first signal can also be used for beam selection between the network device and the terminal device. For example, the at least one first signal can carry a beam identifier, and a beam indicated by the beam identifier is one or more optimal beams the network device selects for the terminal device for downlink transmission, or an optimal beam or a suboptimal beam the network device selects for the terminal device for uplink transmission, or one or more beams the network device uses for sending the first signal.

Optionally, in some implementations, act S120 includes: receiving, by the first device, on the first carrier, the at least one second signal sent by the second device by using a second subcarrier interval, wherein the second subcarrier interval may be the same as the first subcarrier interval, that is, the first device and the second device may use the same subcarrier interval to perform signal transmission, or the second subcarrier interval is specified by a communication system, or the second subcarrier interval is pre-designated by a network device, or the second subcarrier interval is determined by a subcarrier interval configured by a network device for data transmission.

It should be understood that similar to the first subcarrier interval, the second subcarrier interval specified by the communication system may optionally be considered fixed, the communication system may specify one or more subcarrier interval. For example, the communication system specifies that the second subcarrier interval is 60 kHz, then the second device sends the second signal by using the 60 kHz subcarrier interval, and the first device receives the second signal by using the 60 kHz subcarrier interval. For another example, if the communication system specifies that the second subcarrier interval is 60 kHz or 30 kHz, the second device sends the second signal by using the 60 kHz or 30 kHz subcarrier interval, and the first device performs blind detection on the second signal by using the 60 kHz and 30 kHz subcarrier interval respectively to determine the subcarrier interval of the second signal.

Optionally, the second subcarrier interval pre-specified (or preconfigured) by the network device may be considered semi-static, and the network device may reconfigure the second subcarrier interval through dynamic signaling or semi-static signaling.

Optionally, the second subcarrier interval is determined according to the subcarrier interval configured by the network device for data transmission. For example, the second subcarrier interval may be K times the subcarrier interval for data transmission, where K may be 1 or 2, etc.

Optionally, if the second device is a terminal device, the second subcarrier interval may be determined according to the subcarrier interval configured by the network device for uplink transmission, or if the second device is a network device, the second subcarrier interval may be determined according to the subcarrier interval for downlink transmission.

Optionally, in some implementations, the sending of the at least one second signal by the second device may be omnidirectional.

Or, in other implementations, act S120 may include: receiving, by the first device, on the first carrier, the at least one second signal sent by the second device through a second beam, wherein the second beam includes at least one beam, and a spatial domain coverage corresponding to the second beam at least partially overlaps with a spatial domain coverage corresponding to the first beam.

That is, the at least one second signal sent by the second device may be sent through a second beam, and optionally the second beam may also include at least one beam, wherein the spatial domain coverage of the first beam of the at least one first signal sent by the first device at least partially overlaps with the spatial domain coverage corresponding to the second beam.

Here, the spatial domain coverage corresponding to the second beam at least partially overlapping with the spatial domain coverage corresponding to the first beam may include the following cases: the spatial domain coverage area corresponding to the second beam completely overlaps with the spatial domain coverage area corresponding to the first beam, or the spatial domain coverage area corresponding to the second beam is a subset of the spatial domain coverage area corresponding to the first beam, that is, the spatial domain coverage corresponding to the first beam covers the spatial domain coverage corresponding to the second beam, or the spatial domain coverage corresponding to the first beam is a subset of the spatial domain coverage corresponding to the second beam, that is, the spatial domain coverage corresponding to the second beam covers the spatial domain coverage corresponding to the first beam.

It should be understood that the spatial domain coverage corresponding to a beam can be jointly determined by an angle (or a direction) corresponding to the beam, a coverage angle of the beam, and a signal amplitude.

Optionally, in an implementation of the present disclosure, the second signal is used for determining beam indication information of a third beam, wherein the third beam includes at least one of an optimal beam of at least one beam included in the first beam measured by the second device and a suboptimal beam of at least one beam included in the first beam measured by the second device.

Therefore, the second signal may be used for beam selection between the first device and the second device. The first device may determine the optimal beam or suboptimal beam selected by the second device in the first beam according to the received at least one second signal. Optionally, if the first device is a network device, the second device is a terminal device, and the beam indication information of the third beam can be the optimal beam or suboptimal beam measured by the terminal device for downlink transmission, and the third beam is one or more beams in the first beam.

It should be understood that the suboptimal beam in the at least one beam determined by the second device may be the optimal beam for another device, and the selection of the suboptimal beam by the second device for data transmission is beneficial to improve the multi-user multiplexing transmission opportunity, and can also improve the resource utilization rate.

Optionally, in an implementation of the present disclosure, the beam indication information of the third beam may be measured by the second device based on a historical reference signal, or may be measured based on the at least one first signal, which is not limited in the implementation of the present disclosure.

Optionally, the first device sends, on a first time domain resource on the first carrier, the at least one first signal through the first beam, and the first device receives, on a second time domain resource on the first carrier, the at least one second signal sent by the second device, wherein a length of time between the second time domain resource and the first time domain resource is specified by a communication system, or a length of time between the second time domain resource and the first time domain resource is pre-designated by a network device.

In other words, the time domain resource locations where the first device sends and receives signals can have fixed time interval, so that after the first device sends the at least one first signal, a signal can be received after the time interval. It is not necessary to always perform blind detection on the channel to receive a feedback signal of the second device after the at least one first signal is sent. The power consumption of the first device can be reduced, and the performance of the communication system can be improved at the same time.

Optionally, in some implementations, the method 100 further includes: sending, by the first device, a first physical channel to the second device on the first carrier.

After receiving the at least one second signal sent by the second device, the first device can determine that subsequent data transmission can be performed. Further, the first device can send a first physical channel to the second device on the first carrier. Optionally, if the first device is a network device, the second device is a terminal device, and the first physical channel can be a downlink physical channel, such as a PUCCH or a PUSCH, or if the first device is a terminal device, the second device is a network device, and the first network channel can be an uplink physical channel, such as a PUSCH or a PUCCH.

Optionally, in some implementations, the sending of the first physical channel by the first device to the second device may be omnidirectional.

Or, in other implementations, the first device may send, on the first carrier, the first physical channel to the second device through a fourth beam, wherein the spatial domain coverage corresponding to the fourth beam at least partially overlaps with the spatial domain coverage corresponding to the first beam.

Here, the spatial domain coverage corresponding to the fourth beam at least partially overlapping with the spatial domain coverage corresponding to the first beam may include the following cases: the spatial domain coverage area corresponding to the fourth beam completely overlaps with the spatial domain coverage area corresponding to the first beam, or the spatial domain coverage area corresponding to the fourth beam is a subset of the spatial domain coverage area corresponding to the first beam, that is, a area where the first device performs data transmission is less than or equal to a area where the at least one first signal is sent, or the area where the first device performs data transmission may be considered to be less than or equal to a area of channel listening.

Optionally, in some implementations, the fourth beam is one beam in the first beam, or the fourth beam is one beam in the third beam.

In other words, the fourth beam may be one beam in the first beam that the first device uses to send the at least one first signal, or may be one beam in the third beam that the second device selects in the first beam, i.e., the fourth beam may be an optimal beam or a suboptimal beam selected by the second device in the first beam.

Optionally, in some implementations, the method 100 further includes: receiving, by the first device, on the first carrier, at least one second signal sent by a third device.

Optionally, the at least one first signal sent by the first device through the first beam may be received by multiple devices, and the multiple devices receiving the at least one first signal may reply at least one second signal to the first device when a channel is available, wherein the third device may be a device other than the second device among the multiple devices.

It should be understood that the process in which the third device sends the at least one second signal is similar to the process in which the second device sends the at least one second signal. For the sake of brevity, further description will not be given here.

Optionally, in some implementations, the method 100 further includes: sending, by the first device, a second physical channel to the third device on the first carrier.

In other words, after the first device receives the at least one second signal sent by the third device, the first device can determine that subsequent data transmission can be performed, so that it can send a second physical channel to the third device. Specific implementations can refer to the relevant description of the previous implementations, which is not repeated here.

It should be understood that in the implementation of the present disclosure, the first beam that the first device uses to send the at least one first signal may include at least one beam in a first beam set, and the second beam that the second device uses to send the at least one second signal may include at least one beam in a second beam set, the first beam set is a beam set that the first device uses to send signals, and the second beam set is a beam set that the second device uses to send signals.

Optionally, the beam included in the first beam set and the beam included in the second beam set are the same.

Optionally, there is at least one distinct beam in each of the first beam set and the second beam set. For example, the number of beams included in the first beam set is different from the number of beams included in the second beam set, the first beam set includes N beams, N is a positive integer, the N beams correspond to different directions, the second beam set includes M beams, M is a positive integer, the M beams also correspond to different directions, and the N beams in the first beam set and the M beams in the second beam set correspond to the same direction and coverage angle. Assuming M=2*N, a direction and a coverage angle corresponding to one beam in the first beam set are the same as a direction and a coverage angle jointly corresponding to two beams in the second beam set.

Hereinafter, a method for signal transmission according to an implementation of the present disclosure will be described by using an example where a first device is a network device (e.g., gNB) and a second device is a terminal device (UE).

It is assumed that: the first beam set includes beam A, beam B and beam C, and the second beam set includes beam a, beam b and beam c, wherein beam A corresponds to beam a, beam B corresponds to beam b, and beam C corresponds to beam c (in other words, the spatial domain coverage of beam A overlaps with the spatial domain coverage of beam a, the spatial domain coverage of beam B overlaps with the spatial domain coverage of beam b, the spatial domain coverage of the beam C overlaps with the spatial domain coverage of the beam c), and the spatial domain coverage of the beam B and the beam C is a subset of the spatial domain coverage of the beam A (in other words, the spatial domain coverage of the beam A covers at least the spatial domain coverage of the beam B, and the spatial domain coverage of the beam A covers at least the spatial domain coverage of the beam C), and the spatial domain coverage of beam b and beam c is a subset of the spatial domain coverage of beam a (in other words, the spatial domain coverage of beam a covers at least the spatial domain coverage of beam b, and the spatial domain coverage of the beam a covers at least the spatial domain coverage of the beam c). Optionally, the spatial domain coverage of beam B and the spatial domain coverage of beam C may or may not overlap, and the spatial domain coverage of beam b and the spatial domain coverage of beam c may or may not overlap. The implementation of the present disclosure is not particularly limited.

For the first device, the at least one first signal may be sent by using at least one beam among beam A, beam B and beam C. Hereinafter, the signal transmission process will be described with the example where the first device sends the at least one first signal by using beam A (designated as Implementation 1) and sends the at least one first signal by using beam B and beam C (designated as Implementation 2).

Figure 2:
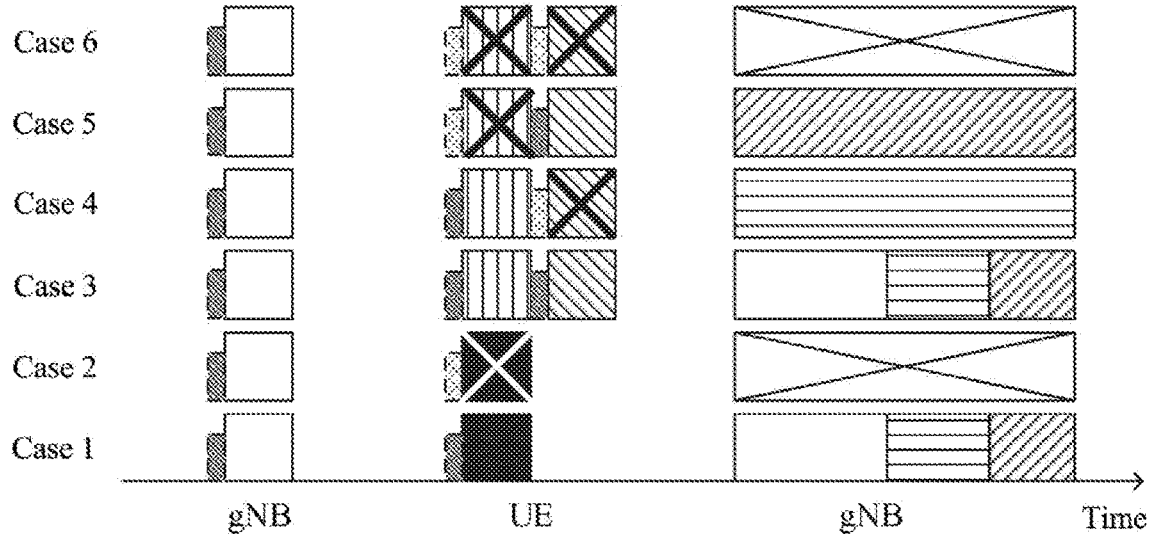
FIG. 2 is a schematic diagram of a method for signal transmission according to an implementation of the present disclosure.

It should be understood that in Implementation 1, after receiving at least one first signal that the first device sends by using beam A, the second device can perform channel detection on at least one beam among beam a, beam b and beam c to determine whether a channel is available. The six cases shown in FIG. 2 are illustrated as examples, and the other cases are similar, and will not be repeated here.

Case 1: after receiving the at least one first signal sent by the first device through beam A, the second device can perform channel detection on the direction corresponding to beam a corresponding to beam A. If the channel detection is successful, the second device can use at least one beam among beam a, beam b and beam c to send the at least one second signal.

Case 2: if the second device fails to detect the channel on the direction corresponding to beam a, the second device may not send the at least one second signal, i.e. it does not use any beam among beam a, beam b and beam c to send the at least one second signal. Accordingly, the first device may cancel the subsequent data transmission, i.e. the first device does not use any beam among beam A, beam B and beam C to send a signal to the second device.

Case 3: the second device can perform channel detection on directions corresponding to the beam b and the beam c. If the channel detection is successful on both the beam b and the beam c, the second device can use the beam b and/or the beam c to send the at least one second signal.

Case 4: the second device can perform channel detection on the directions corresponding to the beam b and the beam c. If the channel detection is successful on the direction corresponding to the beam b and the channel detection fails on the direction corresponding to the beam c, the second device can use the beam b to send the at least one second signal and does not use the beam c to send the at least one second signal.

Case 5: the second device can perform channel detection on the directions corresponding to the beam b and the beam c. If the channel detection fails on the direction corresponding to the beam b and the channel detection is successful on the direction corresponding to the beam c, the second device can use the beam c to send the at least one second signal and does not use the beam b to send the at least one second signal.

Case 6: the second device can perform channel detection on the directions corresponding to the beam b and the beam c. If the channel detection fails on the directions corresponding to the beam b and the channel c, the second device may not use the beam b or the beam c to send the at least one second signal, and accordingly the first device may not perform subsequent data transmission.

Figures 3, 4:
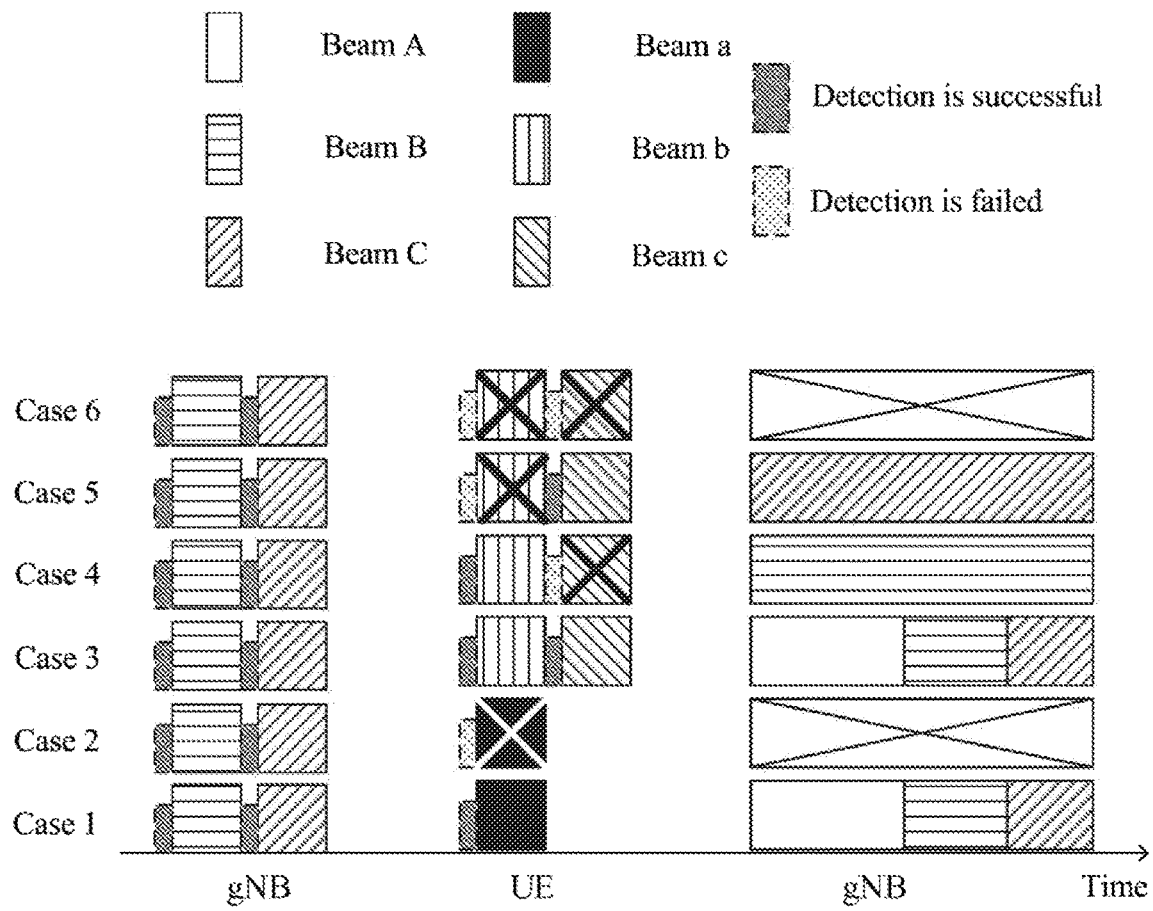
FIG. 3 is another schematic diagram of a method for signal transmission according to an implementation of the present disclosure.
FIG. 4 is a schematic flow chart of a method for signal transmission according to another implementation of the present disclosure.

It should be understood that in Implementation 2, after receiving at least one first signal that the first device sends by using beam B and beam C, the second device can perform channel detection on at least one beam among beam a, beam b and beam c to determine whether a channel is available. The six cases shown in FIG. 3 are illustrated as examples, and the other cases are similar, and will not be repeated here.

Case 1: the second device can perform channel detection on a direction corresponding to the beam a. If the channel detection is successful, the second device can use at least one beam among the beam a, beam b and beam c to send the at least one second signal.

Case 2: the second device can perform channel detection on the direction corresponding to the beam a. If the second device fails to perform channel detection on the beam a, the second device may not send the at least one second signal, that is, any beam among the beams a, b and c is not used for sending the at least one second signal. Accordingly, the first device can cancel subsequent data transmission, that is, the first device does not use any beam among the beams A, B and C to send a signal to the second device.

Case 3: the second device can perform channel detection on the directions corresponding to the beam b and the beam c. If the channel detection is successful on both the directions corresponding to the beam b and the beam c, the second device can use the beam b and/or the beam c to send the at least one second signal.

Case 4: the second device can perform channel detection on the directions corresponding to the beam b and the beam c. If the channel detection is successful on the direction corresponding to the beam b and the channel detection fails on the direction corresponding to the beam c, the second device can use the beam b to send the at least one second signal and does not use the beam c to send the at least one second signal.

Case 5: the second device can perform channel detection on the directions corresponding to the beam b and the beam c. If the channel detection fails on the direction corresponding to the beam b and the channel detection is successful on the direction corresponding to the beam c, the second device can use the beam c to send the at least one second signal and does not use the beam b to send the at least one second signal.

Case 6: the second device can perform channel detection on the directions corresponding to the beam b and the beam c. If the channel detection fails on the directions corresponding to the beam b and the channel c, the second device may not use the beam b or the beam c to send the at least one second signal, and accordingly the first device may not perform subsequent data transmission.

Optionally, the first device carries beam indication information of the beam B and the beam C through the first signals of the beam B and the beam C. After receiving the first signal, the second device selects a beam with better performance, such as the beam B, from the beam B and the beam C according to the historical measurement result or the measurement result of the first signal, and sends the beam indication information of the beam B to the first device through the second signal (For example, beam b corresponding to beam B is used for sending the second signal, or beam b or beam c is used for sending the second signal, wherein the second signal includes a reference signal corresponding to beam B). Upon receiving the second signal, the first device determines beam B according to the second signal, and sends a first physical channel to the second device by using beam B.

With reference to FIGS. 1 to 3, the method for signal transmission according to the implementation of the present disclosure is described above from the perspective of the first device. The method for signal transmission according to another implementation of the present disclosure is described below from the perspective of the second device. It should be understood that the description of the second device side corresponds to the description of the first device side, and similar descriptions can be referred to above. In order to avoid repetition, the description will not be repeated here.

FIG. 4 is a schematic flowchart of a method 400 for signal transmission according to another implementation of the present disclosure, and as shown in FIG. 4, the method 400 includes acts S410 and S420.

In S410, a second device receives, on a first carrier, at least one first signal sent by a first device through a first beam, wherein the first beam includes at least one beam.

In S420, the second device performs channel detection on the first carrier to determine whether at least one second signal is sent.

Optionally, in some implementations, the method 400 further includes: sending, by the second device, the at least one second signal on the first carrier when the channel detection on the first carrier is successful.

Optionally, in some implementations, sending, by the second device, the at least one second signal on the first carrier includes: sending, by the second device, the at least one second signal using a second subcarrier interval on the first carrier, wherein the second subcarrier interval is specified by a communication system, or the second subcarrier interval is pre-designated by a network device, or the second subcarrier interval is determined by a subcarrier interval configured by a network device for data transmission.

Optionally, in some implementations, sending, by the second device, the at least one second signal on the first carrier includes: sending, by the second device, on the first carrier, the at least one second signal through a second beam, wherein the second beam includes at least one beam, and a spatial domain coverage corresponding to the second beam at least partially overlaps with a spatial domain coverage corresponding to the first beam.

Optionally, in some implementations, the spatial domain coverage corresponding to the second beam at least partially overlapping with the spatial domain coverage corresponding to the first beam includes: the spatial domain coverage corresponding to the second beam is a subset of the spatial domain coverage corresponding to the first beam.

Optionally, in some implementations, the second signal is used for determining beam indication information of a third beam, wherein the third beam includes at least one of an optimal beam of at least one beam included in the first beam measured by the second device and a suboptimal beam of at least one beam included in the first beam measured by the second device.

Optionally, in some implementations, the second device receives, on a first time domain resource on the first carrier, the at least one first signal sent by the first device through the first beam, and the second device performs channel detection on a second time domain resource on the first carrier to determine whether the at least one second signal is sent, wherein a length of time between the second time domain resource and the first time domain resource is specified by a communication system, or a length of time between the second time domain resource and the first time domain resource is pre-designated by a network device.

Optionally, in some implementations, receiving, by the second device on the first carrier, the at least one first signal sent by the first device through the first beam includes: receiving, by the second device, on the first carrier, the at least one first signal sent by the first device using a first subcarrier interval and through the first beam, wherein the first subcarrier interval is specified by a communication system, or the first subcarrier interval is pre-designated by a network device, or the first subcarrier interval is determined by a subcarrier interval configured by a network device for data transmission.

Optionally, in some implementations, the second subcarrier interval is the same as the first subcarrier interval.

Optionally, in some implementations, the first signal is used for determining at least one of beam indication information of at least one beam included in the first beam and resources used for transmission of the at least one second signal.

Method implementations of the present disclosure are described in detail above with reference to FIGS. 1 to 4, apparatus implementations of the present disclosure are described in detail below with reference to FIGS. 5 to 8. It should be understood that the apparatus implementations and the method implementations correspond to each other, and description of the method implementations may be referred to for similar description of the apparatus implementations.

Figure 5:
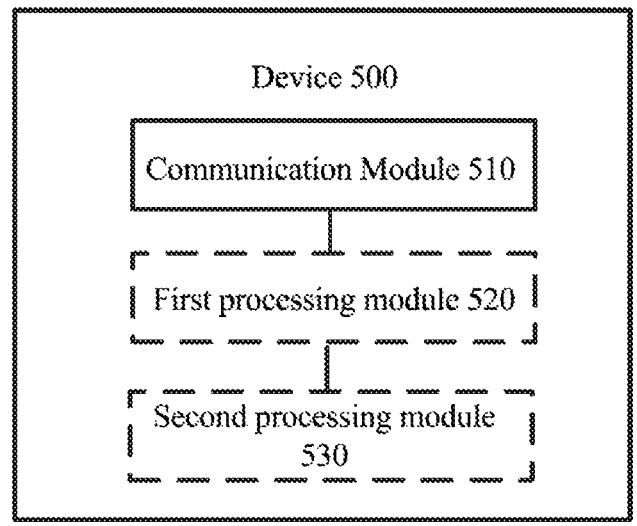
FIG. 5 is a schematic block diagram of a device for signal transmission according to an implementation of the present disclosure.

FIG. 5 shows a schematic block diagram of a device 500 for signal transmission according to an implementation of the present disclosure. As shown in FIG. 5, the device 500 includes a communication module 510.

The communication module 510 is configured to send at least one first signal on a first carrier through a first beam, wherein the first beam includes at least one beam; and receive, on the first carrier, at least one second signal sent by a second device.

Optionally, in some implementations, the communication module 510 is configured to send, on the first carrier, the at least one first signal using a first subcarrier interval and through the first beam by using a first subcarrier interval, wherein the first subcarrier interval is specified by a communication system, or the first subcarrier interval is pre-designated by a network device, or the first subcarrier interval is determined by a subcarrier interval configured by a network device for data transmission.

Optionally, in some implementations, the device 500 further includes a first processing module 520.

The first processing module 520 is configured to, according to the first signal, determine at least one of beam indication information of at least one beam included in the first beam and resources used for transmission of the at least one second signal.

Optionally, in some implementations, the communication module 510 is configured to: receive, on the first carrier, the at least one second signal sent by the second device using a second subcarrier interval, wherein the second subcarrier interval is specified by a communication system, or the second subcarrier interval is pre-designated by a network device, or the second subcarrier interval is determined by a subcarrier interval configured by a network device for data transmission.

Optionally, in some implementations, the communication module 510 is further configured to: receive, on the first carrier, the at least one second signal sent by the second device through a second beam, wherein the second beam includes at least one beam, and a spatial domain coverage corresponding to the second beam at least partially overlaps with a spatial domain coverage corresponding to the first beam.

Optionally, in some implementations, the spatial domain coverage corresponding to the second beam at least partially overlapping with the spatial domain coverage corresponding to the first beam includes: the spatial domain coverage corresponding to the second beam is a subset of the spatial domain coverage corresponding to the first beam.

Optionally, in some implementations, the device 500 further includes a second processing module 530.

The second processing module 530 is configured to, according to the second signal, determine beam indication information of a third beam, wherein the third beam includes at least one of an optimal beam of at least one beam included in the first beam measured by the second device and a suboptimal beam of at least one beam included in the first beam measured by the second device.

Optionally, in some implementations, the device sends, on a first time domain resource on the first carrier, the at least one first signal through the first beam, and the device receives, on a second time domain resource on the first carrier, the at least one second signal sent by the second device, wherein a length of time between the second time domain resource and the first time domain resource is specified by a communication system, or a length of time between the second time domain resource and the first time domain resource is pre-designated by a network device.

Optionally, in some implementations, the communication module 510 is further configured to: send a first physical channel to the second device on the first carrier.

Optionally, in some implementations, the device sends, on the first carrier, the first physical channel to the second device through a fourth beam, wherein a spatial domain coverage corresponding to the fourth beam at least partially overlaps with a spatial domain coverage corresponding to the first beam.

Optionally, in some implementations, the fourth beam is one beam in the first beam.

Optionally, in some implementations, the communication module 510 is further configured to receive, on the first carrier, at least one second signal sent by a third device.

Optionally, in some implementations, the communication module 510 is further configured to send a second physical channel to the third device on the first carrier.

It should be understood that the device 500 for signal transmission according to an implementation of the present disclosure may correspond to the first device in the method implementations of the present disclosure, and the above-mentioned and other operations and/or functions of various units in the device 500 are respectively for realizing the corresponding processes of the first device in the method 100 shown in FIG. 1, and this will not be repeated here for sake of conciseness.

Figure 6:
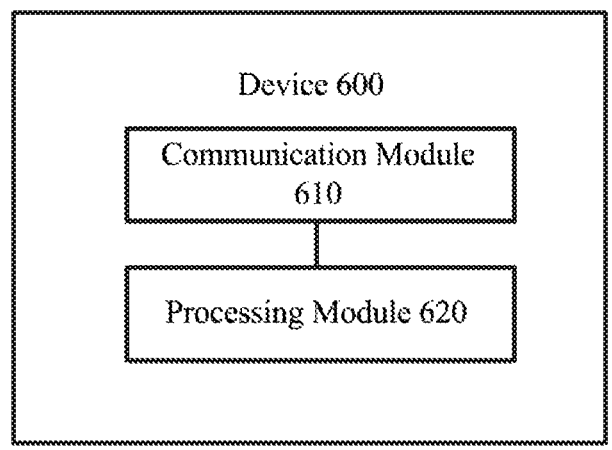
FIG. 6 is a schematic block diagram of a device for signal transmission according to another implementation of the present disclosure.

FIG. 6 is a schematic block diagram of a device for signal transmission according to an implementation of the present disclosure. The device 600 of FIG. 6 includes a communication module 610 and a processing module 620.

The communication module 610 is configured to receive, on a first carrier, at least one first signal sent by a first device through a first beam, wherein the first beam includes at least one beam.

The processing module 620 is configured to perform channel detection on the first carrier to determine whether at least one second signal is sent.

Optionally, in some implementations, the communication module 610 is further configured to send the at least one second signal on the first carrier when the channel detection on the first carrier is successful.

Optionally, in some implementations, the communication module 610 is further configured to send, on the first carrier, the at least one second signal using a second subcarrier interval, wherein the second subcarrier interval is specified by a communication system, or the second subcarrier interval is pre-designated by a network device, or the second subcarrier interval is determined by a subcarrier interval configured by a network device for data transmission.

Optionally, in some implementations, the communication module 610 is further configured to send, on the first carrier, the at least one second signal through a second beam, wherein the second beam includes at least one beam, and a spatial domain coverage corresponding to the second beam at least partially overlaps with a spatial domain coverage corresponding to the first beam.

Optionally, in some implementations, the spatial domain coverage corresponding to the second beam at least partially overlapping with the spatial domain coverage corresponding to the first beam includes: the spatial domain coverage corresponding to the second beam is a subset of the spatial domain coverage corresponding to the first beam.

Optionally, in some implementations, the processing module 620 is further configured to: according to the second signal, determine beam indication information of a third beam, wherein the third beam includes at least one of an optimal beam of at least one beam included in the first beam measured by the device and a suboptimal beam of at least one beam included in the first beam measured by the device.

Optionally, in some implementations, the device receives, on a first time domain resource on the first carrier, the at least one first signal sent by the first device through the first beam, and the device performs channel detection on a second time domain resource on the first carrier to determine whether the at least one second signal is sent, wherein a length of time between the second time domain resource and the first time domain resource is specified by a communication system, or a length of time between the second time domain resource and the first time domain resource is pre-designated by a network device.

Optionally, in some implementations, the communication module 610 is further configured to receive, on the first carrier, the at least one first signal sent by the first device using a first subcarrier interval and through the first beam, wherein the first subcarrier interval is specified by a communication system, or the first subcarrier interval is pre-designated by a network device, or the first subcarrier interval is determined by a subcarrier interval configured by a network device for data transmission.

Optionally, in some implementations, the processing module 620 is further configured to: according to the first signal, determine at least one of beam indication information of at least one beam included in the first beam and resources used for transmission of the at least one second signal.

The device 600 may correspond to (e.g., may be configured in or be itself) the first device described in the method 400, and various modules or units in the device 600 are respectively used for executing various actions or processes performed by the first device in the method 400. Herein, in order to avoid redundancy, detailed description thereof is omitted.

Figure 7:
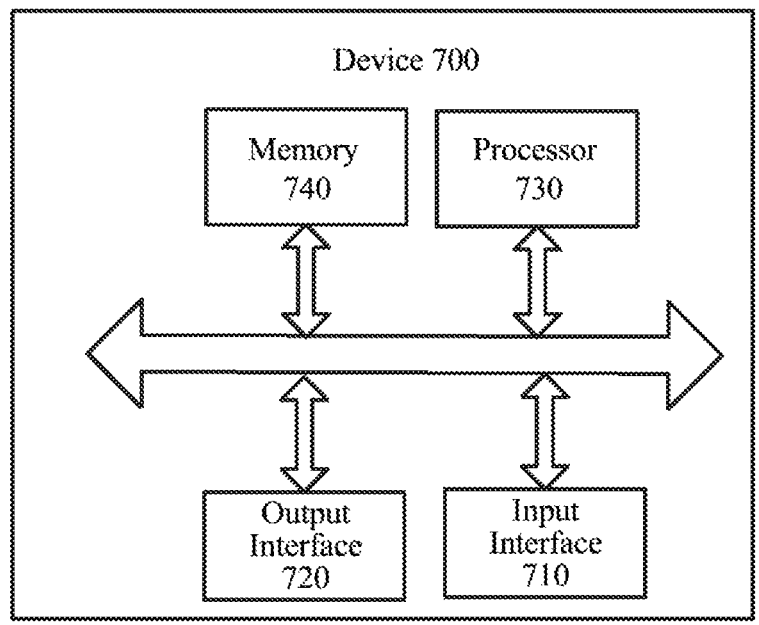
FIG. 7 is a schematic block diagram of a device for signal transmission according to an implementation of the present disclosure.

As shown in FIG. 7, an implementation of the present disclosure also provides a device 700 for signal transmission. The device 700 may be the device 500 in FIG. 5, and may be used for executing the operations of the first device corresponding to the method 100 in FIG. 1. The device 700 includes an input interface 710, an output interface 720, a processor 730, and a memory 740. The input interface 710, the output interface 720, the processor 730, and the memory 740 may be connected through a bus system. The memory 740 is used for storing programs, instructions, or codes. The processor 730 is used for executing programs, instructions, or codes in the memory 740 to control the input interface 710 to receive signals, to control the output interface 720 to send signals, and to complete the operations in the foregoing method implementations.

It should be understood that in the implementations of the present disclosure, the processor 730 may be a Central Processing Unit (CPU), or the processor 730 may be another general processor, a Digital Signal Processor (DSP), an Application Specific Integrated Circuits (ASIC), a Field Programmable Gate Arrays (FPGA) or another programmable logic device, a discrete gate, or a transistor logic device, a discrete hardware components, etc. The general processor may be a microprocessor, or the processor may be any conventional processor or the like.

The memory 740 may include a read-only memory and a random access memory, and provide instructions and data to the processor 730. A portion of memory 740 may include a non-transitory random access memory. For example, the memory 740 may also store information of device type.

In implementation processes, various contents of the methods described above may be accomplished by integrated logic circuits of hardware or instructions in the form of software in the processor 730. The contents of the method disclosed in connection with the implementations of the present disclosure may be directly embodied to be accomplished by an execution of the hardware processor or by the combination of hardware and software modules in the processor. The software modules may be located in a storage medium commonly used in the art, such as a random access memory, a flash memory, a read-only memory, a programmable read-only memory or an electrically erasable programmable memory, or a register. The storage medium is located in the memory 740, and the processor 730 reads information in the memory 740 and completes the contents of the above method in combination with its hardware. In order to avoid repetition, it will not be described in detail here.

In a specific implementation, the communication module 510 included in the device 500 in FIG. 5 may be implemented by the input interface 710 and the output interface 720 in FIG. 7, and the first processing module 520 and the second processing module 530 included in the device 500 in FIG. 5 may be implemented by the processor 730 in FIG. 7.

Figure 8:
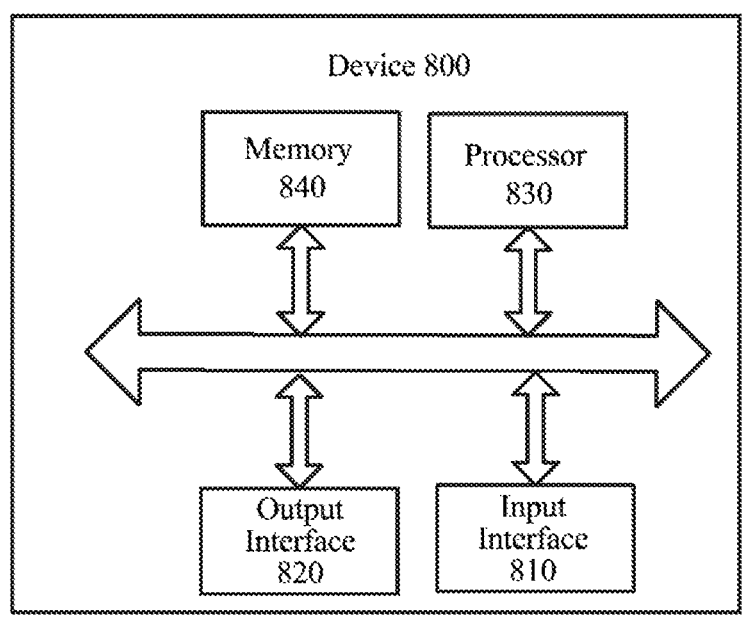
FIG. 8 is a schematic block diagram of a device for signal transmission according to another implementation of the present disclosure.

As shown in FIG. 8, an implementation of the present disclosure provides a device 800 for signal transmission, which may be the device 600 in FIG. 6, and can be used for executing the operations of the second device corresponding to the method 400 in FIG. 4. The device 800 includes an input interface 810, an output interface 820, a processor 830, and a memory 840. The input interface 810, the output interface 820, the processor 830, and the memory 840 may be connected through a bus system. The memory 840 is used for storing programs, instructions, or codes. The processor 830 is used for executing programs, instructions, or codes in the memory 840 to control the input interface 810 to receive signals, to control the output interface 820 to send signals, and to complete the operations in the foregoing method implementations.

It should be understood that in the implementations of the present disclosure, the processor 830 may be a Central Processing Unit (CPU), or the processor 830 may be another general processor, a Digital Signal Processor (DSP), an Application Specific Integrated Circuits (ASIC), a Field Programmable Gate Arrays (FPGA) or another programmable logic device, a discrete gate or a transistor logic device, a discrete hardware components, etc. The general processor may be a microprocessor, or the processor may be any conventional processor or the like.

The memory 840 may include a read-only memory and a random access memory, and provide instructions and data to the processor 830. A portion of memory 840 may include a non-transitory random access memory. For example, the memory 840 may also store information of device type.

In implementation processes, various contents of the methods described above may be accomplished by integrated logic circuits of hardware or instructions in the form of software in the processor 830. The contents of the method disclosed in connection with the implementations of the present disclosure may be directly embodied to be accomplished by an execution of the hardware processor or by the combination of hardware and software modules in the processor. The software modules may be located in a storage medium commonly used in the art, such as a random access memory, a flash memory, a read-only memory, a programmable read-only memory or an electrically erasable programmable memory, or a register. The storage medium is located in the memory 840, and the processor 830 reads information in the memory 840 and completes the contents of the above method in combination with its hardware. In order to avoid repetition, it will not be described in detail here.

In a specific implementation, the communication module 610 included in the device 600 in FIG. 6 may be implemented by the input interface 810 and the output interface 820 in FIG. 8, and the processing module 620 included in the device 600 in FIG. 6 may be implemented by the processor 830 in FIG. 8.

An implementation of the present disclosure provides a computer readable storage medium, the computer readable storage medium stores one or more programs including instructions which, when executed by a portable electronic device including multiple application programs, enable the portable electronic device to perform the methods of the implementations shown in FIGS. 1 to 4.

The implementation of the application provides a computer program, which includes instructions which, when executed by a computer, enable the computer to execute the corresponding flows of the methods of the implementations shown in FIGS. 1 to 4.

Those of ordinary skill in the art will recognize that the example elements and algorithm acts described in connection with the implementations disclosed herein can be implemented in electronic hardware, or a combination of computer software and electronic hardware. Whether these functions are performed in hardware or software depends on the specific application and design constraints of the technical solutions. Skilled artisans may use different methods to implement the described functions in respect to each particular application, but such implementation should not be considered to be beyond the scope of the present disclosure.

Those skilled in the art can clearly understand that for convenience and conciseness of description, corresponding processes in the aforementioned method implementations may be referred to for the specific working processes of the systems, apparatuses, and units described above, which are not repeated here.

In several implementations provided by the present disclosure, it should be understood that the disclosed systems, apparatuses and methods may be implemented in other ways. For example, the apparatus implementations described above are only illustrative, for example, the division of the units is only a logical function division, and there may be other division manners in actual implementation. For example, multiple units or components may be combined or integrated into another system, or some features may be ignored or not executed. On the other hand, the mutual coupling or direct coupling or communication connection shown or discussed may be indirect coupling or communication connection through some interface, apparatus or unit, and may be electrical, mechanical or in other forms.

The unit described as a separate component may or may not be physically separated, and the component shown as a unit may or may not be a physical unit, i.e., it may be located in one place or may be distributed over multiple network units. Some or all of the units may be selected according to practical needs to achieve a purpose of the implementations.

In addition, various functional units in various implementations of the present disclosure may be integrated in one processing unit, or the various units may be physically present separately, or two or more units may be integrated in one unit.

The functions may be stored in a computer readable storage medium if implemented in a form of software functional units and sold or used as a separate product. Based on this understanding, the technical solution of the present disclosure, in essence, or the part contributing to the prior art, or the part of the technical solution, may be embodied in the form of a software product stored in a storage medium, including a number of instructions for causing a computer device (which may be a personal computer, a server, or a network device) to perform all or part of the acts of the method described in various implementations of the present disclosure. The aforementioned storage media include a U disk, a mobile hard disk, a Read-Only Memory (ROM), a Random Access Memory (RAM), a magnetic disk or an optical disk, and another medium capable of storing program codes.

What are described above are merely example implementations of the present disclosure, but the protection scope of the present disclosure is not limited thereto. Any variation or substitution that can be easily conceived by a person skilled in the art within the technical scope disclosed by the present disclosure shall be included within the protection scope of the present disclosure. Therefore, the protection scope of the present disclosure shall be the protection scope defined by the claims.

What is claimed is:

1. A method for signal transmission, comprising:
   receiving, by a terminal device, on a first carrier, at least one first signal sent by a network device through a first beam;
   performing, by the terminal device, channel detection using a second beam on the first carrier to determine whether at least one second signal is sent, wherein a spatial domain coverage corresponding to the second beam overlaps with a spatial domain coverage corresponding to the first beam; and
   sending, by the terminal device, the at least one second signal on the first carrier when the channel detection on the first carrier is successful;
   wherein sending, by the terminal device, the at least one second signal on the first carrier comprises:
      sending, by the terminal device, on the first carrier, the at least one second signal through the second beam.

2. The method of claim 1, wherein receiving, by the terminal device, on the first carrier, the at least one first signal sent by the network device through the first beam comprises:
   receiving, by the terminal device, on the first carrier, the at least one first signal sent by receiving, by the terminal device, on the first carrier, the at least one first signal sent by the network device using a first subcarrier interval and through the first beam,
   wherein the first subcarrier interval is one of specified by a communication system, pre-designated by the network device, or determined by a subcarrier interval configured by the network device for data transmission.

3. The method of claim 1, wherein the first signal is used for determining at least one of beam indication information of at least one beam comprised in the first beam and a resource used for transmission of the at least one second signal.

4. The method of claim 1, wherein sending, by the terminal device, the at least one second signal on the first carrier comprises:
   sending, by the terminal device, the at least one second signal using a second subcarrier interval on the first carrier, wherein the second subcarrier interval is one of specified by a communication system, pre-designated by the network device, or determined by a subcarrier interval configured by the network device for data transmission.

5. A method for signal transmission, comprising:
   sending, by a network device, at least one first signal on a first carrier through a first beam, wherein the first beam comprises at least one beam; and
   receiving, by the network device, on the first carrier, at least one second signal sent by a terminal device, wherein the at least one second signal is sent by the terminal device when channel detection is performed on the first carrier and the channel detection is successful;
   wherein the terminal device uses a second beam for the channel detection of the first carrier, and a spatial domain coverage corresponding to the second beam overlaps with a spatial domain coverage corresponding to the first beam; and wherein receiving, by the network device, on the first carrier, the at least one second signal sent by the terminal device, comprises:
    receiving, by the network device, on the first carrier, the at least one second signal receiving, by the network device, on the first carrier, the at least one second signal sent by the terminal device through the second beam.

6. The method of claim 5, wherein the at least one second signal is used for determining beam indication information of a third beam, wherein the third beam comprises at least one of an optimal beam of at least one beam comprised in the first beam measured by the terminal device and a suboptimal beam of at least one beam comprised in the first beam measured by the terminal device.

7. The method of claim 5, wherein the network device sends the at least one first signal through the first beam on a first time domain resource on the first carrier, and the network device receives, on a second time domain resource on the first carrier, the at least one second signal sent by the terminal device, wherein a length of time between the second time domain resource and the first time domain resource is one of specified by a communication system, or pre-designated by the network device.

8. The method of claim 5, wherein sending, by the network device, the at least one first signal on the first carrier through the first beam, comprises:
    sending, by the network device, on the first carrier, the at least one first signal using a first subcarrier interval and through the first beam,
    wherein the first subcarrier interval is one of specified by a communication system, pre-designated by the network device, or determined by a subcarrier interval configured by the network device for data transmission.

9. The method of claim 5, wherein the first signal is used for determining at least one of beam indication information of at least one beam comprised in the first beam and a resource used for transmission of the at least one second signal.

10. The method of claim 5, wherein receiving, by the network device, on the first carrier, the at least one second signal sent by the terminal device, comprises:
    receiving, by the network device, on the first carrier, the at least one second signal sent by the terminal device using a second subcarrier interval,
    wherein the second subcarrier interval is one of specified by a communication system, pre-designated by the network device, or determined by a subcarrier interval configured by the network device for data transmission.

11. A network device for signal transmission, comprising a processor and a memory, wherein the memory is configured to store a computer program, and the processor is configured to call and run the computer program stored in the memory to perform the method according to claim 5.

12. A terminal device for signal transmission, comprising:
    an input interface configured to receive, on a first carrier, at least one first signal sent by a network device through a first beam;
    a processor configured to perform channel detection using a second beam on the first carrier to determine whether at least one second signal is sent, wherein a spatial domain coverage corresponding to the second beam overlaps with a spatial domain coverage corresponding to the first beam; and
    an output interface configured to send the at least one second signal through the second beam on the first carrier when the channel detection on the first carrier is successful.

\* \* \* \* \*